(12) United States Patent
Boonlikitcheva

(10) Patent No.: US 10,794,025 B2
(45) Date of Patent: Oct. 6, 2020

(54) WAVE CAPTURING AND ATTENUATING STRUCTURE

(71) Applicant: Pichit Boonlikitcheva, Bangkok (TH)

(72) Inventor: Pichit Boonlikitcheva, Bangkok (TH)

( * ) Notice: Subject to any disclaimer, the term of this patent is extended or adjusted under 35 U.S.C. 154(b) by 0 days.

(21) Appl. No.: 16/626,855

(22) PCT Filed: Apr. 9, 2018

(86) PCT No.: PCT/TH2018/000016
§ 371 (c)(1),
(2) Date: Dec. 26, 2019

(87) PCT Pub. No.: WO2019/151958
PCT Pub. Date: Aug. 8, 2019

(65) Prior Publication Data
US 2020/0123724 A1    Apr. 23, 2020

(30) Foreign Application Priority Data
Jan. 31, 2018 (TH) .................................. 1801000628

(51) Int. Cl.
*E02B 3/06* (2006.01)

(52) U.S. Cl.
CPC .................................. *E02B 3/062* (2013.01)

(58) Field of Classification Search
CPC .................................. E02B 3/06; E02B 3/062
(Continued)

(56) References Cited

U.S. PATENT DOCUMENTS 3,991,576 A    11/1976    Tazaki et al.
5,775,248 A    7/1998    Simola
(Continued)

FOREIGN PATENT DOCUMENTS

CN    104532786 A    4/2015
CN    106522158 A    4/2017
(Continued)

OTHER PUBLICATIONS

International Search Report (ISR) and Written Opinion (WO) dated Oct. 31, 2018 for Application No. PCT/TH2018/000016.
(Continued)

*Primary Examiner* — Sunil Singh
(74) *Attorney, Agent, or Firm* — Ladas & Parry LLP

(57) ABSTRACT

A wave capturing and attenuating structure comprising at least one pair of floating structures (100) each coupled with each other in a substantially parallel manner for capturing water-surface waves. The respective floating structures (100) comprise: a body (10) consisting of a floating floor (12) and a side wall (14) extended down from a perimeter of the floating floor (12); and a floating member (20) connected to the floating floor (12) of said body (10) in order to support said body (10) for submerging in the water. Said floating member (20) comprises a wave baffle (22) having at least one part of the baffle (22) located above the water-surface level, wherein said wave baffle (22) of said floating member (20) comprises a surface formed as a vertical plane and inclined at an acute angle with respect to a line extended along the length of said body (10) as viewed from above. Each pair of said floating structures (100) is fixed together such that a passageway (E) is formed as a wave passage. Said structure further comprises: a float (50, 60,70) attached to the rear of said floating structures (100) for attenuating the wave passed through said passageway (E). Said float (50, 60,70) comprises a floatable body (61, 71), and a support plate (68,78) in the form of a flat plate (68,78) located below the water surface and underneath said body (10) in order to assist in stabilization of said float (50, 60,70). In one embodiment of the present invention, the body (10) of the floating structure (100) may also be provided with a support plate (112) in the form of a flat plate located underneath the
(Continued)

body (10) in order to assist in stabilization of the floating structure (100).

9 Claims, 4 Drawing Sheets

(58) Field of Classification Search
USPC .................................................. 405/21, 26
See application file for complete search history.

(56) References Cited

U.S. PATENT DOCUMENTS

| | | |
|---|---|---|
| 5,827,011 A | 10/1998 | Kann |
| 6,767,162 B2 | 7/2004 | Meyers et al. |
| 9,340,940 B2 | 5/2016 | Neelamani et al. |

FOREIGN PATENT DOCUMENTS

| | | | |
|---|---|---|---|
| DE | 197 16 484 A1 | | 10/1998 |
| JP | 8-13443 A | * | 1/1996 |
| KR | 10-2006-0065406 | | 6/2006 |
| KR | 10-2011-0069408 | * | 6/2011 |

OTHER PUBLICATIONS

Espacenet English abstract of CN 104532786 A.
Espacenet English abstract of CN 106522158 A.
Espacenet English abstract of DE 197 16 484 A 1.
Espacenet English abstract of JP 8-13443 A.

* cited by examiner

WAVE CAPTURING AND ATTENUATING STRUCTURE

RELATED APPLICATION

This application is an application under 35 U.S.C. 371 of International Application No. PCT/TH2018/000016 filed on Apr. 9, 2018, the entire contents of which are incorporated herein by reference.

TECHNICAL FIELD

The present invention is in the field of construction engineering and relates to a wave capturing and attenuating structure.

BACKGROUND ART

Due to severe climate changes partly caused by global warming, a shoreline erosion problem caused by severe wind and waves is one serious problem that urgently needs to be solved.

From the prior art, there were attempts to solve this shoreline erosion problem by providing a float installed in the vicinity of the shoreline with an appropriate distance therefrom in order to reduce the strength of waves crashing into the shoreline. Most of the floats have submerged portions and emerged portions for capturing and attenuating water-surface waves and can also utilize energy obtained from the captured waves for rotating an electric generator. For example, U.S. Pat. No. 5,827,011, entitled "Wave Suppression System", issued on Oct. 27, 1998 and U.S. Pat. No. 5,775,248, entitled "Stabilized Float Drum" disclose a float in the form of a box or a cylinder floated above a water surface for attenuating wave strength. However, each of these floats is a single unit, and therefore, it is not sufficiently efficient for wave attenuation. In addition, these floats are unable to capture the waves for utilization, so the wave energy is wasted.

Other wave attenuating devices such as in U.S. Pat. No. 3,991,576, entitled "Floating Breakwater" and U.S. Pat. No. 6,767,162 are in the form of a cylindrical elongated float longitudinally extended in a direction perpendicular to the wave direction, so that it can form a wave protecting line. However, said structure has only a single line, so that in a case of large-sized waves, most of these waves can overtop the structure and may cause damage to the shoreline. Therefore, it is unable to capture these waves as efficiently as expected. In addition, said structure is also unable to utilize the wave energy.

SUMMARY OF THE INVENTION

From aforementioned problems, the objective of the present invention is to provide a wave capturing and attenuating structure in order to attenuate waves resulting in reduction of shoreline erosion, and can also capture the waves resulting in utilization of the wave energy such as electricity generation, etc.

The wave capturing and attenuating structure according to the present invention comprises at least one pair of floating structures each coupled with each other in substantially parallel manner for capturing water-surface waves, wherein the respective floating structures comprise: a body consisting of a floating floor and a side wall extended down from a perimeter of the floating floor, and a floating member connected to the floatable floating floor of the body and said submerged portion in order to support said body for submerging in the water. Said floating member comprises a wave baffle having at least one part of the baffle located above the water-surface level, wherein the baffle has a surface formed as a vertical plane and inclined at an acute angle with respect to a line extended along the length of said body as viewed from above. Each pair of said floating structures is fixed together such that a passageway is formed as a wave passage. Said structure further comprises: a float attached to the rear of said floating structures for attenuating waves passed through said passageway. Said float comprises a floatable body and a submerged portion, and a support plate in the form of a flat plate and located below the water surface and underneath said body in order to assist in stabilization of said float.

These and other objectives and features of this invention will become more clearly apparent when considered in conjunction with the accompanying drawings and the following detailed description of the invention.

DETAILED DESCRIPTION

Figure 1A:
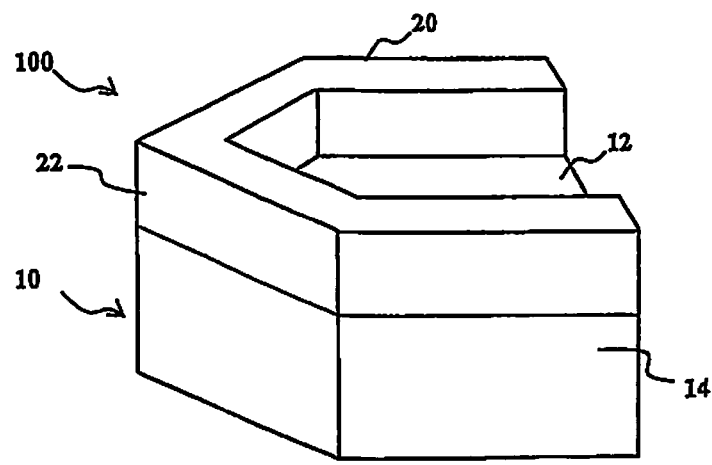
FIGS. 1A and 1B are perspective views showing a floating structure 100 according to the first and second embodiments of this invention respectively.

The description of the present invention is given by way of exemplary embodiments of this invention with reference to drawings in order to be examples and assist in more clearly description, in which like elements in these drawings are identified by like reference numerals. While particular embodiments of the present invention have been illustrated and described, they are not intended to limit this invention, and the scope of this invention is defined in the appended claims.

FIG. 1A is a perspective view showing a floating structure 100 according to the first embodiment.

According to FIG. 1A, the floating structure 100 comprises a body 10 consisting of a floating floor 12 and a side wall 14 extended down from a perimeter of the floating floor 12, and a floating member 20 connected to the floating floor 12 of the body 10 in order to support the body 10 for submerging in the water and acting as a wave barrier.

Furthermore, the floating member 20 of the floating structure 100 comprises a wave baffle 22 having at least one part of the baffle located above the water-surface level. The wave baffle 22 of the floating member 20 comprises a surface formed in the form of a vertical plane. The floating member 20 has a hollow cavity 23 therein such as it may be in the form of a sealed chamber containing air or gas therein, such that the floating member 20 has density less than water, so that the floating member can be floated. Furthermore, the floating member 20 may contain a material with density less than that of water such as closed-cell foam, etc. in order to increase the strength of the floating member, or the floating member 20 may be made of a strong lightweight material with density less than that of water such as polypropylene plastic or low-density polyethylene (LDPE) or high-density polyethylene (HDPE), etc.

Figure 1B:
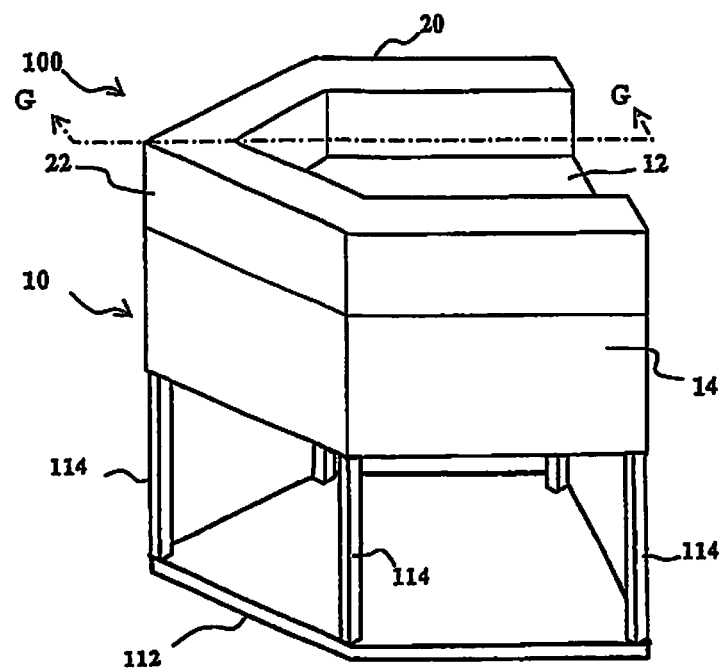

FIG. 1B is a perspective view showing a floating structure 100 according to the second embodiment having most features similar to those of the first embodiment, except that, according to this embodiment of this invention, the floating structure 100 further comprises a support plate 112 in the form of a flat plate located underneath the body and fixed to the body 10 via a plurality of legs 114 extended downward in order to assist in stabilization of the floating structure as well.

Figure 2:
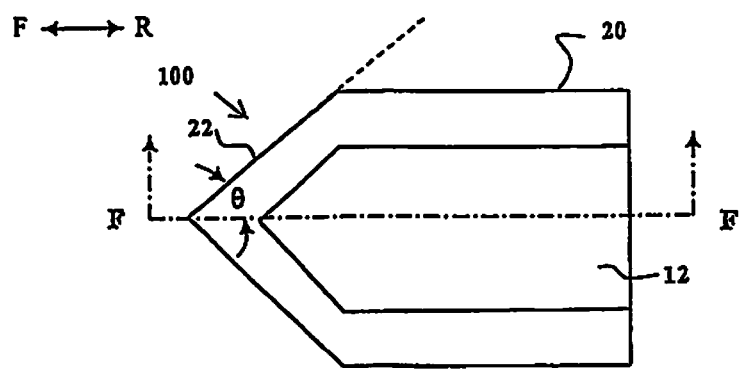
FIG. 2 shows a top view of the floating structure.

As shown in FIG. 2, the wave waffle 22 of the floating member 20 is inclined at an acute angle θ with respect to a line extended along the length of said body as viewed from above, wherein the acute angle θ may be in the range of 30-60 degrees, preferably about 45 degrees, in order to encounter the incoming wave and reduce the wave strength, including collect the wave in the predetermined direction at the same time as will be explained in detail hereafter.

Figure 3:
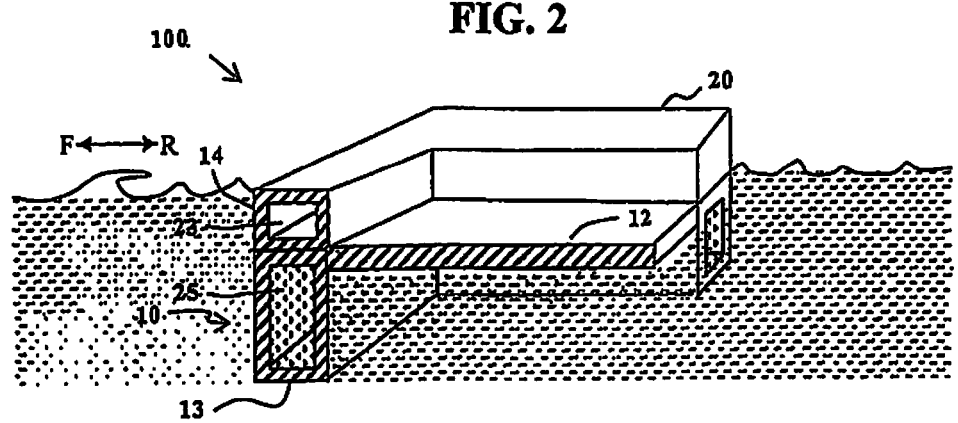
FIG. 3 shows a cross-sectional view of the floating structure 100 taken along line F-F in FIG. 2.

FIG. 3 shows a cross-sectional view of the floating structure 100 taken along line F-F in FIG. 2 and illustrates a hollow portion 25 of the body 10, wherein the hollow portion is hollow and contains water or allows water to admit therein, or the hollow portion may be configured such that liquid can admit to the space of the hollow portion 25. In one embodiment, the body 10 may consist of a lower wall 13 for closing a lower portion of the side wall 14 of the body 10, or in one aspect, the lower wall 13 of the body 10 may be opened in order to admit water to the hollow portion, such that the water can help to damp the body 10 in order to enhance stabilization of the structure, while it is being moved up and down vertically due to the waves.

The floating member 20 has a chamber or a hollow cavity 23 therein, wherein said chamber may be a sealed chamber containing air therein, so that the floating member 20 can be floated, or the chamber may contain a material with density less than that of water such as closed-cell foam or the like, etc., so that the floating member 20 is lightweight with increased strength.

Figure 4:
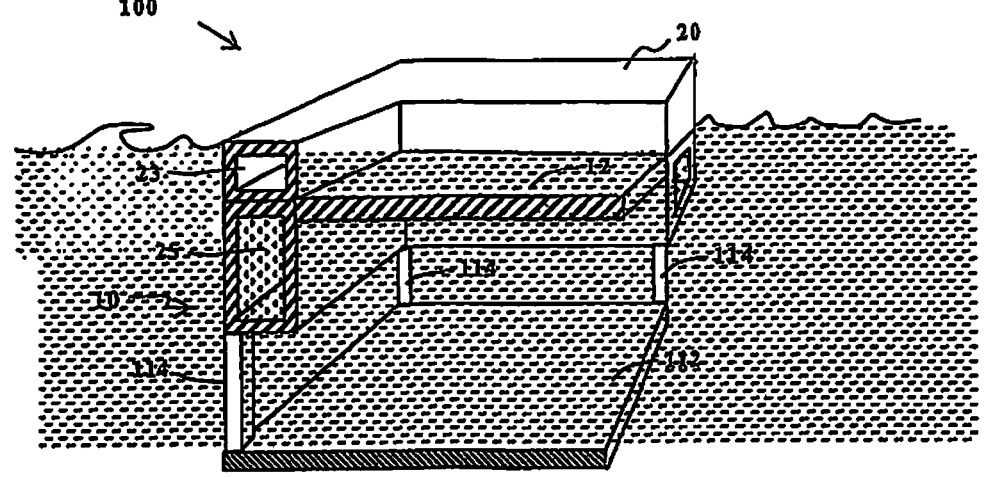
FIG. 4 shows a cross-sectional view of the floating structure 100A taken along line G-G of FIG. 1B for another embodiment of this invention.

FIG. 4 shows a cross-sectional view of the floating structure 100 taken along line G-G in FIG. 1B. FIG. 4 illustrates a support plate 112 attached to the body 10 via legs 114, so that the plate is submerged in the water. Moreover, the support plate 112 may have two or more plates, wherein each of the support plates 112 is attached to the body in the form of a layer via the plurality of legs 114 (not shown) in order to enhance the stability.

Figure 5:
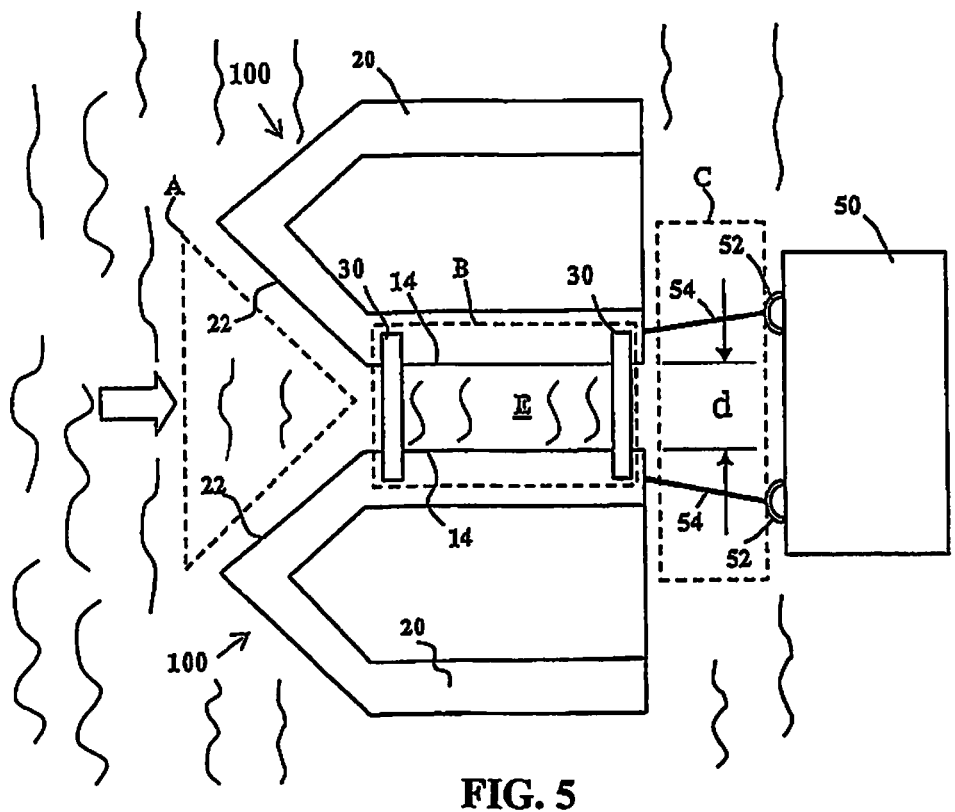
FIG. 5 shows a top view of a wave capturing and attenuating structure according to this invention.

FIG. 5 shows a top view of a wave capturing and attenuating structure according to this invention.

The wave capturing and attenuating structure according to this invention comprises at least one pair of the floating structures 100 as described above for capturing water-surface waves, wherein the floating structures are coupled together in an approximately parallel manner. Each pair of said floating structures 100 is fixed together by a fixing means 30, such that they are spaced apart from each other, and a passageway E is formed into the wave passage. The wave baffles 22 of each floating structure 100 are cooperatively formed into zone A for receiving waves travelling to the shoreline, and each of said floating structures 100 is, thus, forced to move and face the waves. Therefore, the structure can efficiently capture the waves.

According to FIG. 5, the wave passed through zone A is collected, and its velocity is increased as the wave flows through the passageway E formed from the side walls 14 of each floating structure 100. The passageway E located between each pair of floating structures 100 results in that the captured wave has sufficient velocity and energy for utilizing such as employing for rotating a hydro-turbine of an electric generator (not shown) installed in zone A and/or zone B, and then the wave travels through the passageway E into zone C located at the rear of the floating structures 100. Moreover, the passageway E has a width d depending upon the size of the floating structure.

The wave departed from the passageway E still has strength and may cause damage to the shoreline. Therefore, the wave capturing and attenuating structure according to this invention provides with a float 50, wherein the float 50 is attached to the rear of floating structure 100 by ropes or a strings, etc. The float 50 is spaced apart from the passageway E and located between the pair of the floating structures 100 with a suitable distance for efficiently attenuating the wave departed from said passageway E.

The captured wave travels through the passageway E via zone B, and then impacts on the float 50 located at the rear next to the passageway E, so that the wave energy will be dissipated before reaching the shoreline. Therefore, the remaining energy of the wave is not enough to erode the shoreline.

Figure 6:
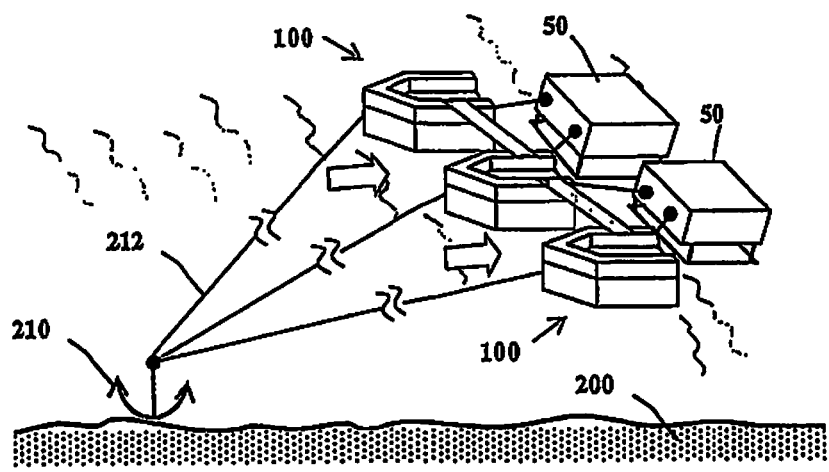
FIG. 6 shows a perspective view of the wave capturing and attenuating structure according to this invention during deployment.

According to FIG. 6, the installation and deployment is illustrated. The wave capturing and attenuating structure according to this invention is securely fixed to a floor 200 of a body of water by an anchor 210, a pile, a steel post, a concrete block, or the like via ropes or strings 212, such that the floating structure 100 can be moved or rotated to face the wave direction. Therefore, the utilization of the captured wave can be maximized, and the structure is more stabilized and can better withstand the wave strength at the same time.

Hereafter, details of the float 50 and various embodiments of the float according to this invention will be described.

The float 50 has density less than water, wherein the float may be in the form of a hollow cavity for containing air or a material with density less than that of water therein such as closed-cell foam, etc., so that one part of the float is emerged from the water and the other part of the float is submerged in the water.

Figure 7:
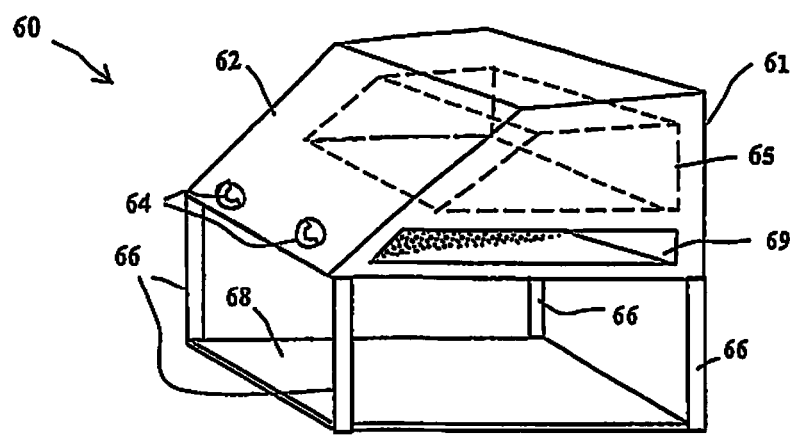
FIG. 7 shows an embodiment of a float 60 according to this invention.

FIG. 7 shows an embodiment of a float 60 according to this invention.

According to FIG. 7, the float 60 comprises a body 61 having a hollow portion 65 (shown by a dash line) therein. The inside of the hollow portion 65 may contain air or foam therein in order to increase its strength. The body 61 further comprises a box-structure portion 69 in the form of an opening, such that water can be introduced into the box-structure portion 69. The box-structure portion 69 may be partitioned into multiple chambers in order to enhance the strength of the body 61, and the box-structure portion 69 acts as a vertical stabilizer for the float 60 at the same time, when the float is moved up and down following movement of the wave. During deployment, the box-structure portion 69 is submerged under the water surface resulting in damping the movement, while at least some part of the hollow portion 65 of the body 61 is emerged from the water. In addition, the float 60 has a support plate 68 mounted to a lower floor of the body 61 of the float 60 via a plurality of mounting elements or legs 66, such that the support plate 68 is spaced apart from the body 61 at a certain distance, wherein this distance can be adjusted according to the depth of the water. Further, during deployment, said support plate 68 is located below the water surface and underneath said float in order to assist in vertical stabilization of the float 60. Note that in the case of severe waves, two or more support plates 68 respectively can be provided underneath the float 60. These plates are mounted separately one above another in the form of layers at certain vertical distances (not shown) as appropriate in order to increase vertical drag forces, so that it helps to enhance the stability of the float 60.

In one embodiment, the float 60 may further comprise an inclined face 62 arranged for facing the incoming wave. The inclined face 62 is inclined at an angle of about 20-60 degrees with respect to an approximately horizontal line depending upon the design. One part of the inclined face 62 is submerged in the water, while the remaining part is emerged from the water, such that an incoming wave impacting on the float 60 can travel upward along the surface of the inclined face 62. Some part of the wave may travel through the inclined face 62 and overtop to the rear of the float 60, meanwhile the remaining part of the wave will flow back downward along the inclined face 62. However, if the slope of the inclined face 62 is too small, most part of the wave can travel over the float 60 toward the shoreline, so that the float is unable to efficiently attenuate the wave. Whereas, if the slope of the inclined face 62 is too large, the float may withstand an excessive wave-impact force, so that the float 60 may be oscillated and lack stability.

The float 60 further comprises loops 64 for attaching the float 60 to the floating structure 100 as mentioned above.

Figure 8:
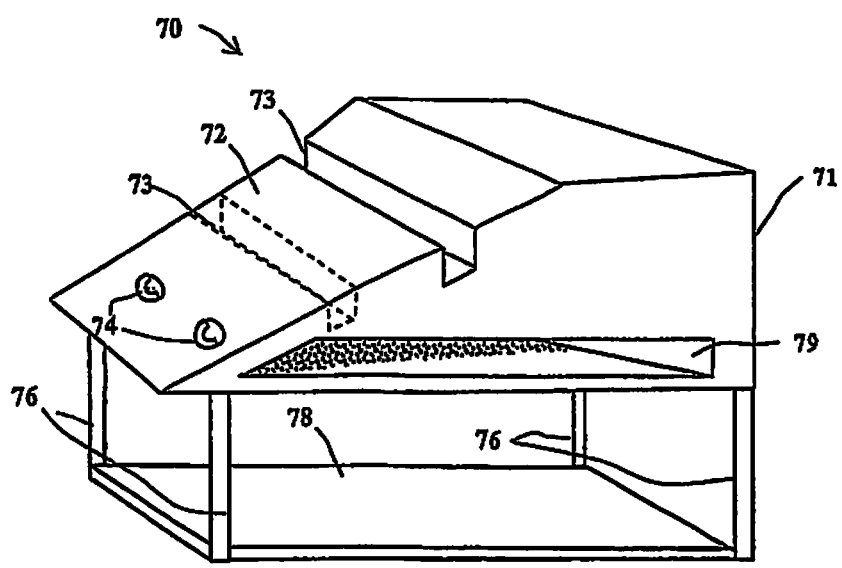
FIG. 8 shows another embodiment of a float 70 according to this invention.

FIG. 8 shows another embodiment of a float 70 according to this invention.

According to FIG. 8, the float 70 comprises a body 71 having a box-structure portion 79 in the form of an opening, such that water can be introduced into the box-structure portion 79. The box-structure portion 79 may be partitioned into multiple chambers in order to enhance the strength of the body 71, and the box-structure portion 79 acts as a vertical stabilizer for the float 70 at the same time, when the float is moved up and down following movement of the wave. During deployment, since the box-structure portion 79 is submerged under the water surface, it results in damping the vertical movement of the float, while at least some part of the hollow portion (not shown) of the body 71 is emerged from the water in order to support the float 70 for floating above the water surface. In addition, the float 70 also has a support plate 78 mounted to the body 71 of the float 70 via a plurality of mounting elements 76, such that the support plate 78 is spaced apart from the body 71. Further, during deployment, said support plate 78 is located below the water surface and underneath said float in order to assist in stabilization of the float 70.

The float 70 comprises an inclined face 72 arranged for facing the incoming wave. The inclined face 72 is inclined at an angle of about 20-60 degrees with respect to the horizontal line. Furthermore, the inclined face 72 also includes discharge grooves 73, for example at least one groove, wherein the discharge grooves are laterally extended for discharging water and sand entrained in the incoming wave which impacts on the inclined face of the float 70, such that the water is laterally discharged with respect to the direction of the wave.

The float 70 further comprises loops 74 for attaching the float 70 to the floating structure 100.

As described above, it appears that the wave capturing and attenuating structure according to the present invention is improved such that water waves can be captured and attenuated in order to alleviate the shoreline-erosion problem, wherein two wave capturing and attenuating lines are provided, so that they can be efficiently operated. Furthermore, the captured wave can also be utilized in other applications, for example employed in rotating a turbine of a hydro-turbine electric generator for electricity generation, etc., instead of allowing it to be wasted.

Although this invention has been described in the detailed description when taken in conjunction with the accompanying drawings as examples, it should be understood that various modifications and changes by persons having ordinary skill in the related art may be made without departing from the scope and objectives of this invention. The scope of this invention complies with this invention as stated in the appended claims, it also covers features of this invention, even if they are not particularly specified in the claims, but it is applicable and effective in the similar features of this invention as stated in the claim

The invention claimed is:

1. A wave capturing and attenuating structure comprising at least one pair of floating structures each coupled to each other such that the wave capturing and attenuating structure is arranged along a wave-encountering line for capturing water-surface waves, wherein each of said at least one pair of floating structures comprise:

a body comprising a floating floor and a side wall extended down from a perimeter of the floating floor; and a floating member connected to the floating floor of said body in order to support said body for submerging in water, wherein said floating member comprises a wave baffle having at least one part of the wave baffle located above a water-surface level, wherein said wave baffle of said floating member comprises a surface formed as a vertical plane and is inclined at an acute angle with respect to a line extended along a length of said body as viewed from above, wherein each of said at least one pair of floating structures is fixed together by a fixing means, such that they are spaced apart from each other, and a passageway is formed into a wave passage, and, therefore, each of said at least one pair of floating structures is forced to face an incoming wave, wherein each of said at least one pair of floating structures further comprises: a float attached to a rear with respect to each of said at least one pair of floating structures, and the float is spaced apart from said passageway arranged between each of said at least one pair of floating structures for attenuating a wave departed from said passageway, wherein said float comprises a floatable body, and a support plate in a form of a flat plate and located below a water surface and underneath said body in order to assist in stabilization of said float.

2. The wave capturing and attenuating structure according to claim 1, wherein the body of each of said at least one pair of floating structures also includes a support plate in a form of a flat plate located underneath the body in order to assist in stabilization of said wave capturing and attenuating structure.

3. The wave capturing and attenuating structure according to claim 1, wherein each of said floating member and said float is in a form of a hollow cavity.

4. The wave capturing and attenuating structure according to claim 1, wherein each of said floating member and said float contains a material with density less than that of water.

5. The wave capturing and attenuating structure according to claim 1, wherein, during deployment, each of said at least one pair of floating structures is fixed to a floor of a body of water.

6. The wave capturing and attenuating structure according to claim 1, wherein the support plate of said float is mounted to the body of the float via a plurality of mounting elements, such that the support plate is spaced apart from said body of the float, and during deployment, said support plate is located below the water surface and underneath said floatable body in order to assist in stabilization of said float.

7. The wave capturing and attenuating structure according to claim 1, wherein said float comprises an inclined face arranged for facing the incoming wave.

8. The wave capturing and attenuating structure according to claim 7, wherein said inclined face includes at least one discharge groove for laterally discharging with respect to a direction of the incoming wave.

9. The wave capturing and attenuating structure according to claim 7, wherein said inclined face is inclined at an angle of about 20-60 degrees with respect to a horizontal line.

* * * * *